United States Patent
Gaethke et al.

(10) Patent No.: US 9,577,718 B2
(45) Date of Patent: Feb. 21, 2017

(54) SYSTEMS AND METHODS FOR INDUCTIVELY COUPLED COMMUNICATIONS

(71) Applicant: QUALCOMM Incorporated, San Diego, CA (US)

(72) Inventors: Rainer Gaethke, San Francisco, CA (US); Mohammad Mahdi Ghahramani, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/547,837

(22) Filed: Nov. 19, 2014

(65) Prior Publication Data

US 2016/0142113 A1    May 19, 2016

(51) Int. Cl.
*H04B 5/00* (2006.01)
*H04W 4/00* (2009.01)
*H04L 27/148* (2006.01)
*H04W 56/00* (2009.01)

(52) U.S. Cl.
CPC .......... *H04B 5/0093* (2013.01); *H04B 5/0031* (2013.01); *H04L 27/148* (2013.01); *H04W 4/008* (2013.01); *H04W 56/0035* (2013.01); *H04B 5/0056* (2013.01); *H04B 5/0075* (2013.01)

(58) Field of Classification Search
CPC ..... H04W 4/008; H04W 92/18; H04B 5/0031; H04B 5/0025; H04M 1/7253; H04M 2250/04; H04M 1/6091; H04M 2250/02
USPC ................................ 455/41.1, 41.2
See application file for complete search history.

(56) References Cited

U.S. PATENT DOCUMENTS

| | | | |
|---|---|---|---|
| 7,532,822 B2 | 5/2009 | Sun et al. | |
| 7,724,843 B2 | 5/2010 | May et al. | |
| 8,249,650 B2 | 8/2012 | Rofougaran et al. | |
| 2009/0079656 A1* | 3/2009 | Peyla | H01Q 1/273 343/860 |
| 2011/0133894 A1* | 6/2011 | Hennig | H03J 3/20 340/10.1 |

(Continued)

FOREIGN PATENT DOCUMENTS

| | | |
|---|---|---|
| EP | 2544378 A2 | 1/2013 |
| EP | 2680457 A2 | 1/2014 |
| WO | 2012032130 A1 | 3/2012 |

OTHER PUBLICATIONS

AMS, NFC Active Boost, "AS3922—NFC payment for microSD and SIM fact sheet", Feb. 2013, 2 pages.

(Continued)

*Primary Examiner* — Edward Urban
*Assistant Examiner* — Max Mathew
(74) *Attorney, Agent, or Firm* — Austin Rapp & Hardman

(57) ABSTRACT

A method for inductively coupled communications is described. The method includes generating a retransmitted modulated signal that is stronger than a received signal from a first device. The method also includes generating a suppressed carrier signal from the retransmitted modulated signal for retransmission to the first device. The method further includes filtering a superimposed signal of the suppressed carrier signal on the received signal to attenuate modulation sidebands. The method additionally includes synchronizing to the first device based on the filtered signal.

30 Claims, 12 Drawing Sheets

(56) References Cited

U.S. PATENT DOCUMENTS

| | | | |
|---|---|---|---|
| 2011/0198398 A1* | 8/2011 | Itay .................... | G06K 7/10356 |
| | | | 235/439 |
| 2011/0241837 A1* | 10/2011 | Suzuki ................. | G06K 7/0008 |
| | | | 340/10.1 |
| 2012/0071089 A1* | 3/2012 | Charrat .............. | G06K 19/0723 |
| | | | 455/41.1 |
| 2012/0282857 A1* | 11/2012 | Zhang .................. | H04B 5/0031 |
| | | | 455/41.1 |
| 2014/0273830 A1 | 9/2014 | Wong et al. | |

OTHER PUBLICATIONS

International Search Report and Written Opinion—PCT/US2015/056450—ISA/EPO—Dec. 15, 2015.

\* cited by examiner

SYSTEMS AND METHODS FOR INDUCTIVELY COUPLED COMMUNICATIONS

TECHNICAL FIELD

The present disclosure relates generally to electronic devices. More specifically, the present disclosure relates to systems and methods for inductively coupled communications.

BACKGROUND

The use of electronic devices has become common. In particular, advances in electronic technology have reduced the cost of increasingly complex and useful electronic devices. Cost reduction and consumer demand have proliferated the use of electronic devices such that they are practically ubiquitous. And, as the use of electronic devices has expanded, so has the demand for new and improved features for them. More specifically, electronic devices that perform new functions and/or perform faster, more efficiently, or with higher quality are often in high demand.

Some electronic devices (e.g., smartphones) transmit wireless signals. Wireless signals may, for example, be utilized to communicate with other electronic devices. For instance, the wireless signals may convey voice information or data. In some implementations, the wireless communication may be over an inductive coupling between devices. The size of the antennas and the mobility (i.e., relative motion) of the transmitter and receiver may affect the wireless signals. As the size of antennas decreases, inductive coupling factors may also reduce. To compensate for the reduced antenna size, electronic devices may communicate using active load modulation. System and methods for synchronizing a second device to a first device during active load modulation may be beneficial.

SUMMARY

A method for inductively coupled communications is described. The method includes generating a retransmitted modulated signal that is stronger than a received signal from a first device. The method also includes generating a suppressed carrier signal from the retransmitted modulated signal for retransmission to the first device. The method further includes filtering a superimposed signal of the suppressed carrier signal on the received signal to attenuate modulation sidebands. The method additionally includes synchronizing to the first device based on the filtered signal.

The retransmitted modulated signal may include a carrier and modulation sidebands that have greater amplitudes than the received signal. Generating the suppressed carrier signal may include reducing a carrier amplitude of the retransmitted modulated signal below the amplitude of the received signal. Filtering the superimposed signal to attenuate modulation sidebands may include reducing the amplitude of modulation sidebands of the superimposed signal below the amplitude of the received signal.

Synchronizing to the first device may include recovering a clock from the received signal using the filtered signal. Synchronizing to the first device may further include phase locking the suppressed carrier signal to the received signal using phase-locked loop (PLL) circuitry. The filtering may include discrete filtering using the recovered clock from the received signal.

The inductively coupled communications may be near-field communications (NFC). The suppressed carrier signal may be generated for active load modulation to retransmit a modulated signal.

Circuitry for inductively coupled communications is also described. The circuitry includes a retransmitted signal generator that generates a retransmitted modulated signal that is stronger than a received signal from a first device. The circuitry also includes a suppressed carrier signal generator that generates a suppressed carrier signal from the retransmitted modulated signal for retransmission to the first device. The circuitry further includes a modulation sideband filter that filters a superimposed signal of the suppressed carrier signal on the received signal to attenuate modulation sidebands. The circuitry additionally includes a synchronization block that synchronizes to the first device based on the filtered signal.

An apparatus for inductively coupled communications is also described. The apparatus includes means for generating a retransmitted modulated signal that is stronger than a received signal from a first device. The apparatus also includes means for generating a suppressed carrier signal from the retransmitted modulated signal for retransmission to the first device. The apparatus further includes means for filtering a superimposed signal of the suppressed carrier signal on the received signal to attenuate modulation sidebands. The apparatus additionally includes means for synchronizing to the first device based on the filtered signal.

A computer-program product for inductively coupled communications is also described. The computer-program product includes a non-transitory computer-readable medium having instructions thereon. The instructions include code for causing an apparatus to generate a retransmitted modulated signal that is stronger than a received signal from a first device. The instructions also include code for causing the apparatus to generate a suppressed carrier signal from the retransmitted modulated signal for retransmission to the first device. The instructions further include code for causing the apparatus to filter a superimposed signal of the suppressed carrier signal on the received signal to attenuate modulation sidebands. The instructions additionally include code for causing the apparatus to synchronize to the first device based on the filtered signal.

DETAILED DESCRIPTION

Figure 1:
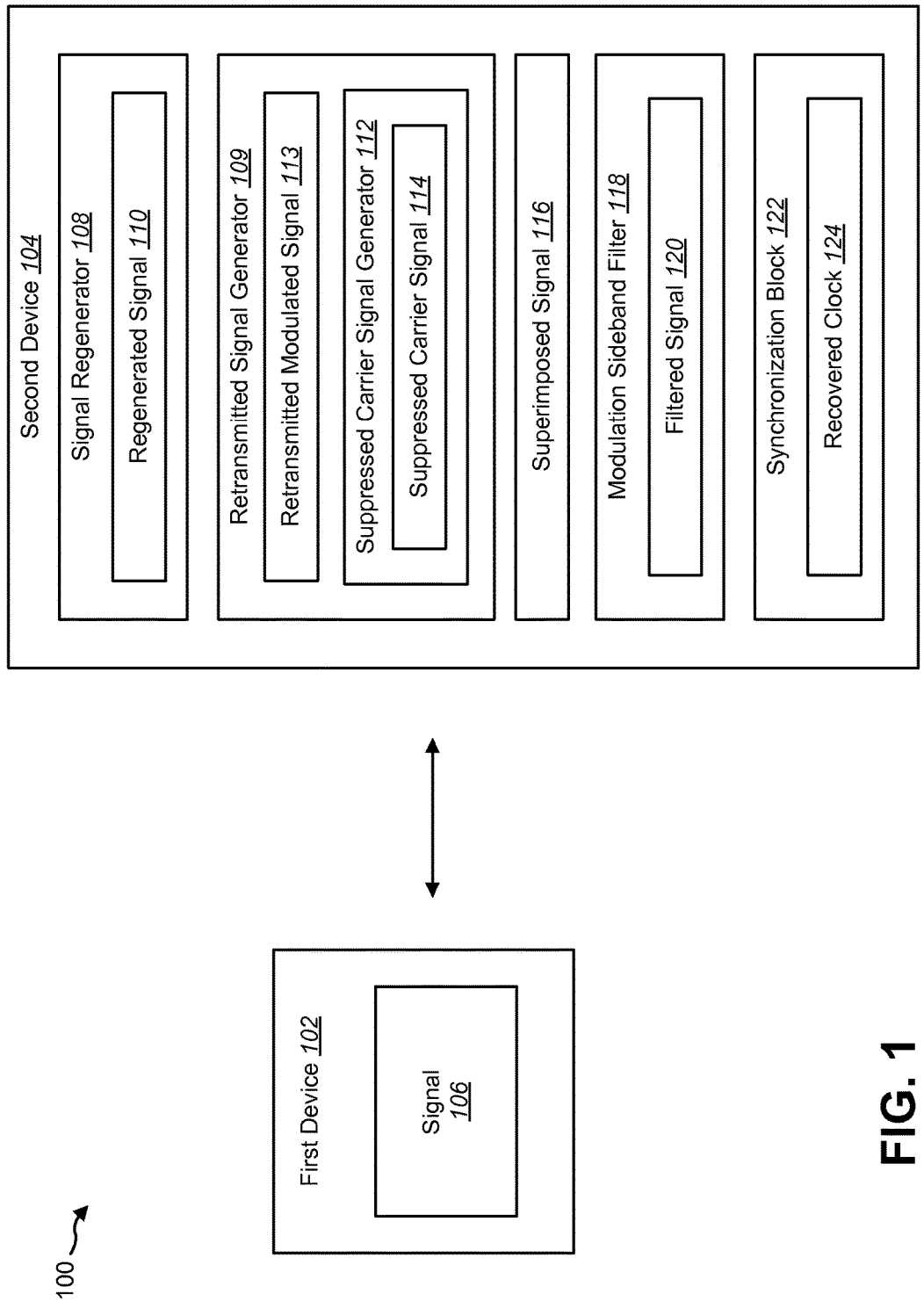
FIG. 1 is a block diagram illustrating one configuration of a wireless communication system in which inductively coupled communication may be implemented.

The systems and methods disclosed herein may be applied to communication devices that communicate wirelessly and/or that communicate using a wired connection or link. For example, some communication devices may communicate with other devices using an Ethernet protocol. In another example, some communication devices may communicate with other devices using wireless communication. In one configuration, the systems and methods disclosed herein may be applied to a communication device that communicates with another device using an induction-based communication technology. One implementation of inductively coupled communication technology is near-field communication (NFC).

The systems and methods described herein relate to near-field communication (NFC) target transmission and reception. In particular, the described systems and methods may be used in the area of active load modulation (ALM).

In one approach for NFC communication, the direction for the data flow in the NFC communication standards is characterized by having a first device (also referred to as a poller, polling device, proximity coupling device (PCD) or initiator) provide an electromagnetic field. A second device (also referred to as a listener, listening device, proximity integrated circuit card (PICC) or target) may generate modulation content via a passive load modulation. In passive load modulation, modulation of the signal may be achieved by switching resistive or reactive elements within the second device.

The trend in electrical devices, especially for mobile applications, is to introduce smaller antenna sizes. However, smaller antennas may exhibit smaller coupling factors for inductively coupled communication. This may make it difficult to achieve specification limits for the load modulation level on the first device using passive load modulation with the second device.

To compensate for the deficiencies of passive load modulation, the second device may use active load modulation (ALM). With ALM, alternate circuit approaches are based on synchronizing the second device to the signal from the first device. The second device may regenerate the signal received from the first device. The second device may then retransmit a phase-synchronized modulated signal to the first device. With ALM, the resulting level of the modulation received at the first device can be higher than the modulation level produced by a traditional passive (e.g., resistive) load modulation.

Problems may arise in ALM with regenerating the signal from the first device by the second device in the presence of a strong retransmitted signal generated from the second device itself. For example, the signal from the first device may be regenerated in the second device using a phase-locked loop (PLL) circuit. The retransmitted signal has to be phase locked to the signal from the first device for proper ALM operation. However, if the retransmitted signal is stronger than the signal from the first device, then the PLL may not be able to lock to the signal of the first device.

In one approach to overcoming these problems associated with ALM, the second device may transmit with a lower modulation level. However, this approach may lead to a less-efficient active load modulation scheme.

In another approach, dual antennas may be utilized. In this approach, a modulated signal is transmitted on one antenna, and an incoming carrier (e.g., field clock) from the first device may be received on a separate antenna. However, this approach results in additional hardware overhead due to multiple antennas.

In yet another approach, the incoming carrier from the first device is gated. In this approach, the second device is synchronized in the time-domain. However, this approach may experience one or more time-domain based limitations.

The systems and methods described herein may provide for synchronization of a first device and a second device for active load modulation during inductively coupled communication. In particular, a phase-locked loop (PLL)-based clock generation from a suppressed carrier signal for inductively coupled communication is described. In one configuration, the inductively coupled communication may be near-field communication (NFC).

Various configurations are now described with reference to the Figures. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication system 100 in which inductively coupled communication may be implemented. The system 100 may include a first device 102 and a second device 104. Examples of electronic devices include wireless communication devices, cellular phones, smartphones, tablet devices, voice recorders, digital cameras, still cameras, camcorders, gaming systems, laptop computers, etc. Each component of the electronic devices described herein (e.g., the first device 102 and the second device 104) may be implemented in hardware (e.g., circuitry) or a combination of hardware and software (e.g., a processor with executable instructions stored in memory).

The first device 102 and the second device 104 may communicate with each other using inductively coupled communication. In one configuration, the inductively coupled communication may be near-field communication (NFC). In inductively coupled communication, the first device 102 may generate an electromagnetic field to which the second device 104 may be coupled. For example, in the case of NFC, the direction for the data flow in the NFC standards is characterized by having the first device 102 (also referred to as a poller, polling device, proximity coupling device (PCD) or initiator) provide the electromagnetic field.

The first device 102 may send a signal 106 to the second device 104. The signal 106 may include a carrier frequency. In the case of NFC, the signal 106 may have a carrier frequency of 13.56 megahertz (MHz). The signal 106 may also be referred to as a carrier wave (CW). The carrier frequency may also be referred to as a field clock.

The second device 104 (also referred to as a listener, listening device, proximity integrated circuit card (PICC) or target) may communicate with the first device 102 by generating modulation content. In one configuration, the second device 104 may generate the modulation content using active load modulation (ALM).

In one approach to ALM, the second device 104 may regenerate the signal 106 from the first device 102. For example, the second device 104 may include a signal regenerator 108 that produces the regenerated signal 110. In one configuration, the signal regenerator 108 is a phase-locked loop (PLL) circuit. The second device 104 may use the regenerated signal 110 to communicate with the first device 102.

The second device 104 may include a retransmitted signal generator 109. The retransmitted signal generator 109 may modulate the regenerated signal 110 to produce a retransmitted modulated signal 113. In one approach, the retransmitted modulated signal 113 may be retransmitted back to the first device 102. The modulation may be produced by modulation sidebands that are associated with the carrier of the regenerated signal 110. The modulation of the retransmitted signal may convey data to the first device 102.

To achieve a strong coupling factor between the first device 102 and the second device 104, the retransmitted modulated signal 113 may be stronger than the signal 106 received from the first device 102. In one approach to ALM, the carrier and the modulation sidebands of the retransmitted modulated signal 113 may have greater amplitudes (e.g., power) than the received signal 106. However, problems may arise in ALM with regenerating the signal 106 from the first device 102 by the second device 104 in the presence of a strong retransmitted signal. The stronger carrier of the retransmitted modulated signal 113 from the second device 104 may obscure the carrier of the received signal 106, as illustrated in the superimposed spectrum described in connection with FIG. 6. In this case, the PLL of the second device 104 may not be able to lock onto the phase of the received signal 106.

To facilitate synchronizing with the first device 102, the second device 104 may generate a suppressed carrier signal 114 and filter the modulation sidebands. A suppressed carrier signal generator 112 may generate a suppressed carrier signal 114 from the retransmitted modulated signal 113 for retransmission to the first device 102. For example, the suppressed carrier signal generator 112 may reduce the carrier amplitude of the retransmitted modulated signal 113 below the amplitude of the received signal 106. In one configuration, the maximum absolute value of the retransmitted modulated signal 113 carrier may be reduced to be less than the maximum absolute value of the received signal 106 carrier. The carrier suppression may be performed in the frequency-domain or may be performed in the time domain by generating a signal that has spectral properties of a suppressed carrier signal 114.

Upon generating the suppressed carrier signal 114, the suppressed carrier signal 114 may have modulation sidebands that are stronger than the received signal 106, but the carrier of the suppressed carrier signal 114 may be weaker than the carrier than the received signal 106. In other words, the carrier amplitude of the suppressed carrier signal 114 may be less than the carrier amplitude of the received signal 106. The suppressed carrier signal 114 may be transmitted to the first device 102.

The suppressed carrier signal 114 may be superimposed on the received signal 106 from the first device 102. In one configuration, the second device 104 may have a single antenna to receive the signal 106 from the first device 102 and transmit the suppressed carrier signal 114. In this configuration, the suppressed carrier signal 114 may be combined (e.g., superimposed) with the received signal 106 at the antenna.

A modulation sideband filter 118 may receive the superimposed signal 116 and produce a filtered signal 120. The modulation sideband filter 118 may reduce the amplitude of modulation sidebands of the superimposed signal 116 below the amplitude of the received signal 106. In one configuration, the maximum absolute value of the modulation sidebands is less than the maximum absolute value of the received signal 106 carrier. The filtered signal 120 may be a combination of the suppressed modulation sidebands and carrier of the suppressed carrier signal 114 and the received signal 106. In one configuration, the modulation sideband filtering may be performed in the frequency-domain.

A synchronization block 122 may synchronize the second device 104 to the first device 102 based on the filtered signal 120. The synchronization block 122 may recover a clock 124 from the received signal 106 using the filtered signal 120. The recovered clock 124 may be the carrier frequency (e.g., field clock) of the received signal 106. In one configuration, the synchronization block 122 may include a PLL circuitry. In on configuration, the PLL circuitry of the synchronization block 122 may be the same as the PLL circuitry of the signal regenerator 108. In another configuration, the PLL circuitry of the synchronization block 122 may be distinct from the PLL circuitry of the signal regenerator 108.

Because the modulation sidebands and the carrier of the retransmitted signal (i.e., the suppressed carrier signal 114) are less than the received signal 106, the synchronization block 122 may lock to the signal 106 of the first device 102. An example of the spectrum of the filtered signal received at the synchronization block 122 is described in connection with FIG. 8.

Using the recovered clock 124, the phase of the suppressed carrier signal 114 may be synchronized with the signal 106 from the first device 102. The resulting level of modulation at the first device 102 may be higher than can be achieved with traditional passive (e.g., resistive) load modulation. Furthermore, additional hardware overhead is avoided by using one antenna to both transmit and receive inductively coupled communication signals. Additionally, because the described systems and methods use a frequency-domain approach to ALM synchronization, problems associated with time-domain approaches are avoided.

Figure 2:
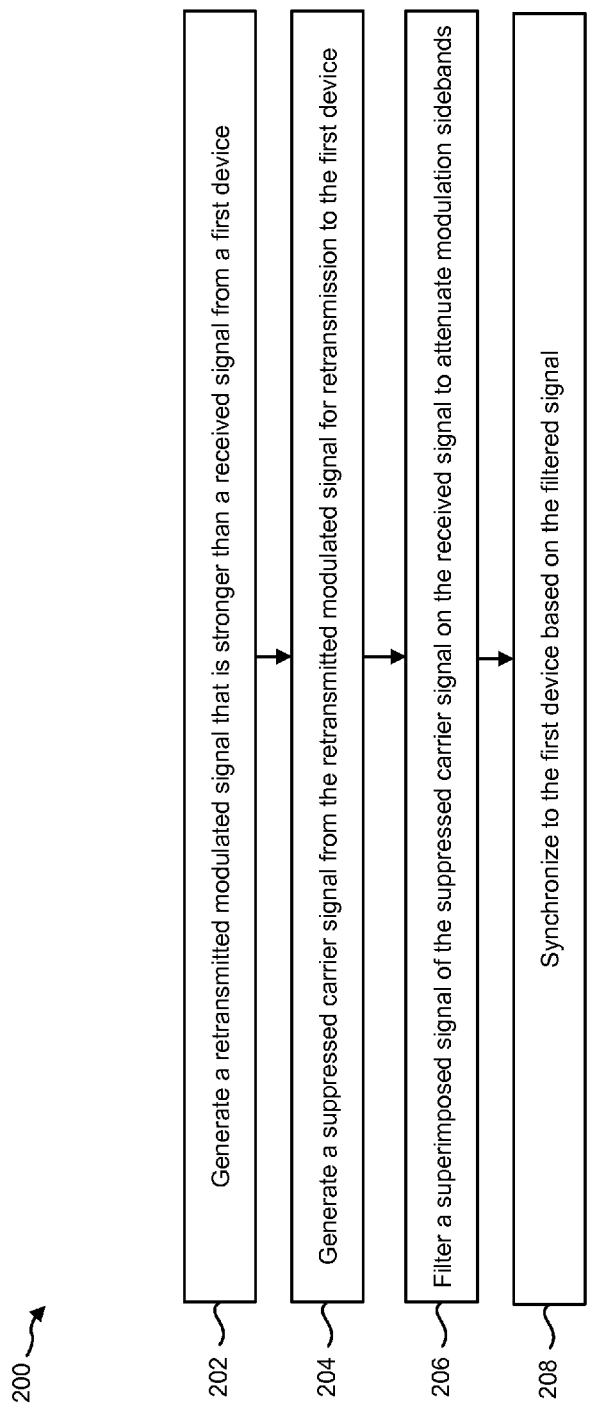
FIG. 2 is a flow diagram illustrating a method for inductively coupled communications between a first device and a second device.

FIG. 2 is a flow diagram illustrating a method 200 for inductively coupled communications between a first device 102 and a second device 104. The method 200 may be implemented by the second device 104. In the case of near-field communication (NFC), the second device 104 may be a listening device (also referred to as a target) that may receive a signal 106 from the first device 102 (also referred to as a polling device or initiator). The method 200 may be implemented as part of active load modulation (ALM) between the first device 102 and the second device 104.

The first device 102 may send a signal 106 to the second device 104. The signal 106 may include a carrier frequency. In the case of NFC, the signal 106 may have a carrier frequency of 13.56 MHz.

The second device 104 may generate 202 a retransmitted modulated signal 113 that is stronger than a received signal 106 from a first device 102. For example, the second device 104 may include a phase-locked loop (PLL) circuit that produces the regenerated signal 110. The second device 104 may modulate the regenerated signal 110. To achieve a strong coupling factor between the first device 102 and the second device 104, the retransmitted modulated signal 113 may be stronger than the signal 106 received from the first device 102. In one approach to ALM, the carrier and the modulation sidebands of the retransmitted modulated signal 113 may have greater amplitudes (e.g., power) than the received signal 106.

The second device 104 may generate 204 a suppressed carrier signal 114 from the retransmitted modulated signal 113 for retransmission to the first device 102. For example, the second device 104 may reduce the carrier amplitude of the retransmitted modulated signal 113 below the amplitude of the received signal 106. The suppressed carrier signal 114 may be transmitted to the first device 102.

The second device 104 may filter 206 a superimposed signal 116 of the suppressed carrier signal 114 on the received signal 106 to attenuate the modulation sidebands. In one configuration, the second device 104 may have a single antenna to receive the signal 106 from the first device 102 and transmit the suppressed carrier signal 114. In this configuration, the suppressed carrier signal 114 may be combined (e.g., superimposed) with the received signal 106 at the antenna. The second device 104 may reduce the amplitude of modulation sidebands of the superimposed signal 116 below the amplitude of the received signal 106. Therefore, the filtered signal 120 may be a combination of the suppressed modulation sidebands and carrier of the suppressed carrier signal 114 and the received signal 106.

The second device 104 may synchronize 208 to the first device 102 based on the filtered signal 120. The second device 104 may recover a clock 124 from the received signal 106 using the filtered signal 120. The recovered clock 124 may be the carrier frequency (e.g., field clock) of the received signal 106. In one configuration, the second device 104 may use PLL circuitry to synchronize the second device 104 to the first device 102. Because the modulation sidebands and the carrier of the retransmitted signal (i.e., the suppressed carrier signal 114) are less than the received signal 106, the PLL circuitry may lock to the signal 106 of the first device 102. Using the recovered clock 124, the phase of the suppressed carrier signal 114 may be synchronized with the signal 106 received from the first device 102.

Figure 3:
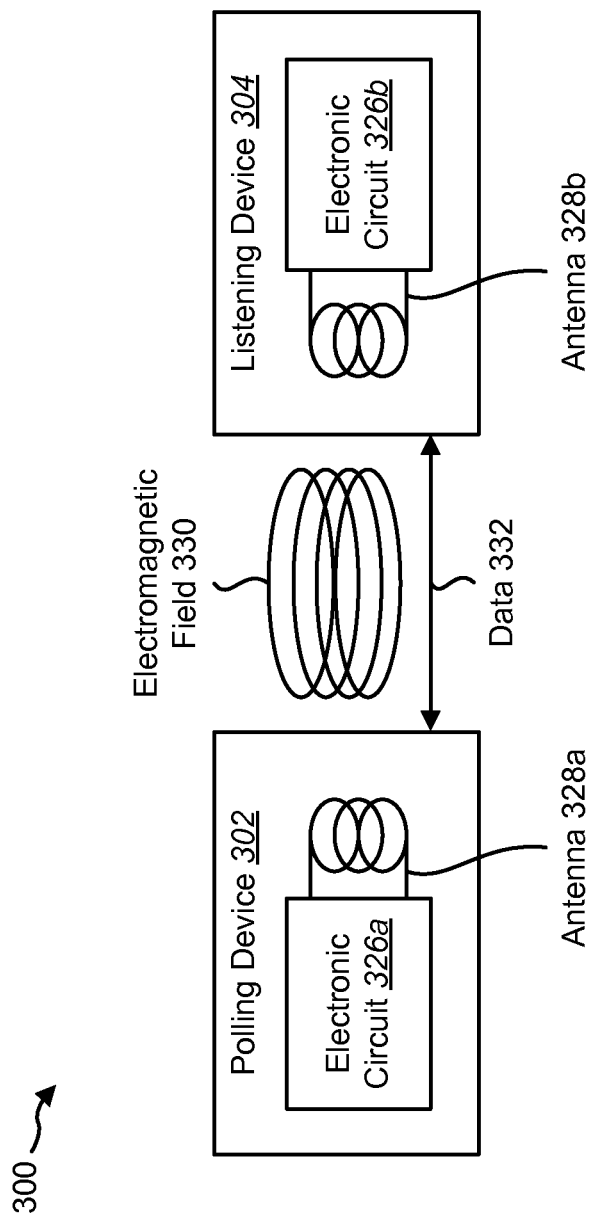
FIG. 3 is a block diagram illustrating one configuration of inductively coupled communication in a wireless communication system.

FIG. 3 is a block diagram illustrating one configuration of inductively coupled communication in a wireless communication system 300. A polling device 302 and a listening device 304 may operate according to near-field communication (NFC) protocols. The polling device 302 may be implemented according to the first device 102 described in connection with FIG. 1. The listening device 304 may be implemented according to the second device 104 described in connection with FIG. 1. Each device 302, 304 may include an antenna 328a-b connected to an electronic circuit 326a-b. During operation, the combination of two NFC devices (i.e., the polling device 302 and listening device 304) may behave like a transformer.

NFC is an inductive coupling communication technology. The two NFC-capable devices 302, 304 may be separated by a distance. An alternating current may pass through a primary coil (i.e., the polling device antenna 328a) and create an electromagnetic field 330 (which may also be referred to as a radio frequency (RF) field or radiated field). The electromagnetic field 330 may induce a current in the secondary coil (i.e., the listening device antenna 328b). The listening device 304 may use the electromagnetic field 330 transmitted by the polling device 302 to power itself.

The configuration and tuning of both antennas 328a-b may determine the coupling efficiency from one device to the other device. The polling device 302 and the listening device 304 are shown in FIG. 3. During certain NFC transactions, the listening device 304 may function as a target, which is a role defined in the NFC standards.

In one configuration, the NFC transmitter of one device and the NFC receiver of the other device are configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the "near-field" of the radiated field.

An NFC device may include an NFC loop antenna 328. The NFC loop antenna 328 may provide a means for energy transmission and reception. As stated, an efficient energy transfer may occur by coupling a large portion of the energy in the near-field of a transmitting antenna 328 to a receiving antenna 328 rather than propagating most of the energy in an electromagnetic wave to the far field. When in this near-field, a coupling mode may be developed between NFC loop antennas 328. The area around the NFC loop antennas 328 where this near-field coupling may occur is referred to herein as a coupling-mode region.

An NFC-capable device may obtain sufficient data 332 to allow for communications to be established. One form of communications that may be established is an international standards organization data exchange protocol (ISO-DEP) communication link. Communications between the NFC devices may be enabled over a variety of NFC radio frequency (RF) technologies, including but not limited to, NFC-A, NFC-B, etc.

Figure 4:
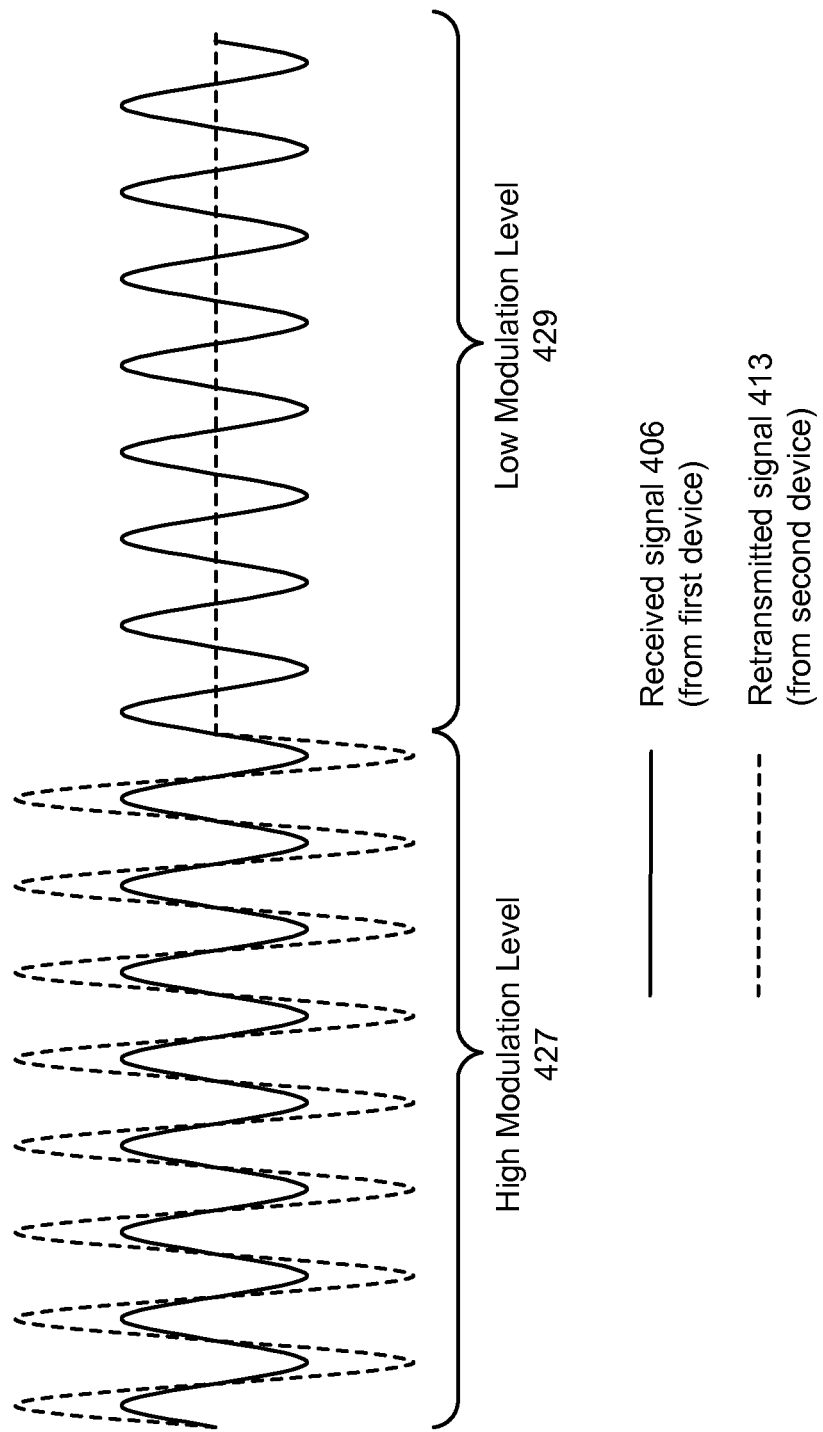
FIG. 4 illustrates a received signal and a retransmitted signal for inductively coupled communication.

FIG. 4 illustrates a received signal 406 and a retransmitted modulated signal 413 for inductively coupled communication. The received signal 406 may be generated by a first device 102. The retransmitted modulated signal 413 may be generated by a second device 104.

In one configuration, the second device 104 may generate the retransmitted modulated signal 413 for active load modulation (ALM). The second device 104 may communicate information to the first device 102 by retransmitting a modulated signal. The retransmitted modulated signal 413 may have different modulation levels. In one case, the retransmitted modulated signal 413 may have a high modulation level 427. With the high modulation level 427, the amplitude of the retransmitted modulated signal 413 may be greater than the amplitude of the received signal 406. It should be noted that in the case of a high modulation level 427, the retransmitted modulated signal 413 is stronger than the received signal 406.

In another case, the retransmitted modulated signal 413 may have a low modulation level 429. With the low modulation level 429, the amplitude of the retransmitted modulated signal 413 may be less than the amplitude of the received signal 406.

Figure 5:
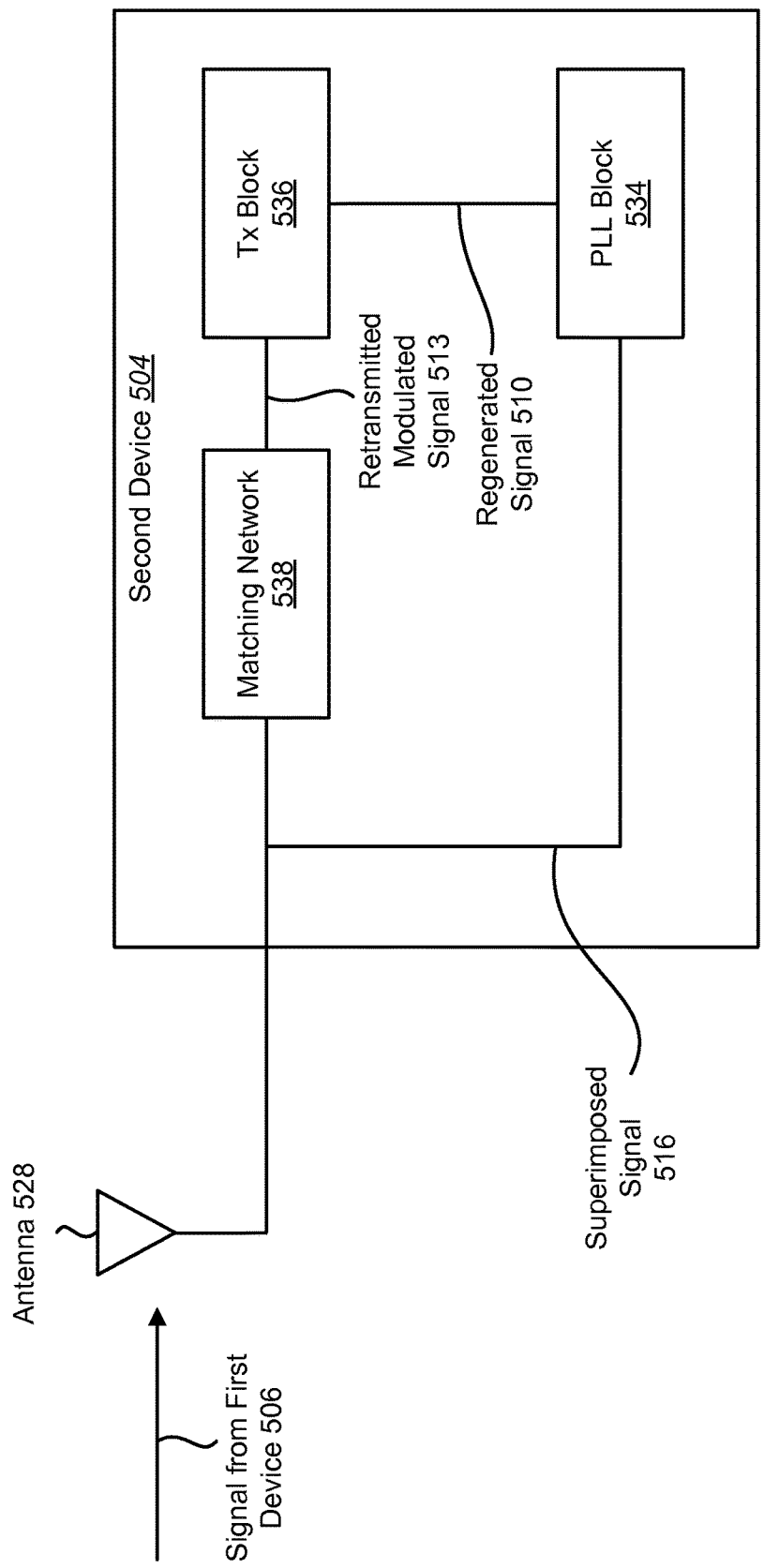
FIG. 5 is a block diagram illustrating a detailed configuration of a second device in which inductively coupled communication may be implemented.

FIG. 5 is a block diagram illustrating a detailed configuration of a second device 504 in which inductively coupled communication may be implemented. The second device 504 may communicate with a first device 102 (not shown) using inductively coupled communication. In one configuration, the inductively coupled communication may be near-field communication (NFC).

Figure 6:
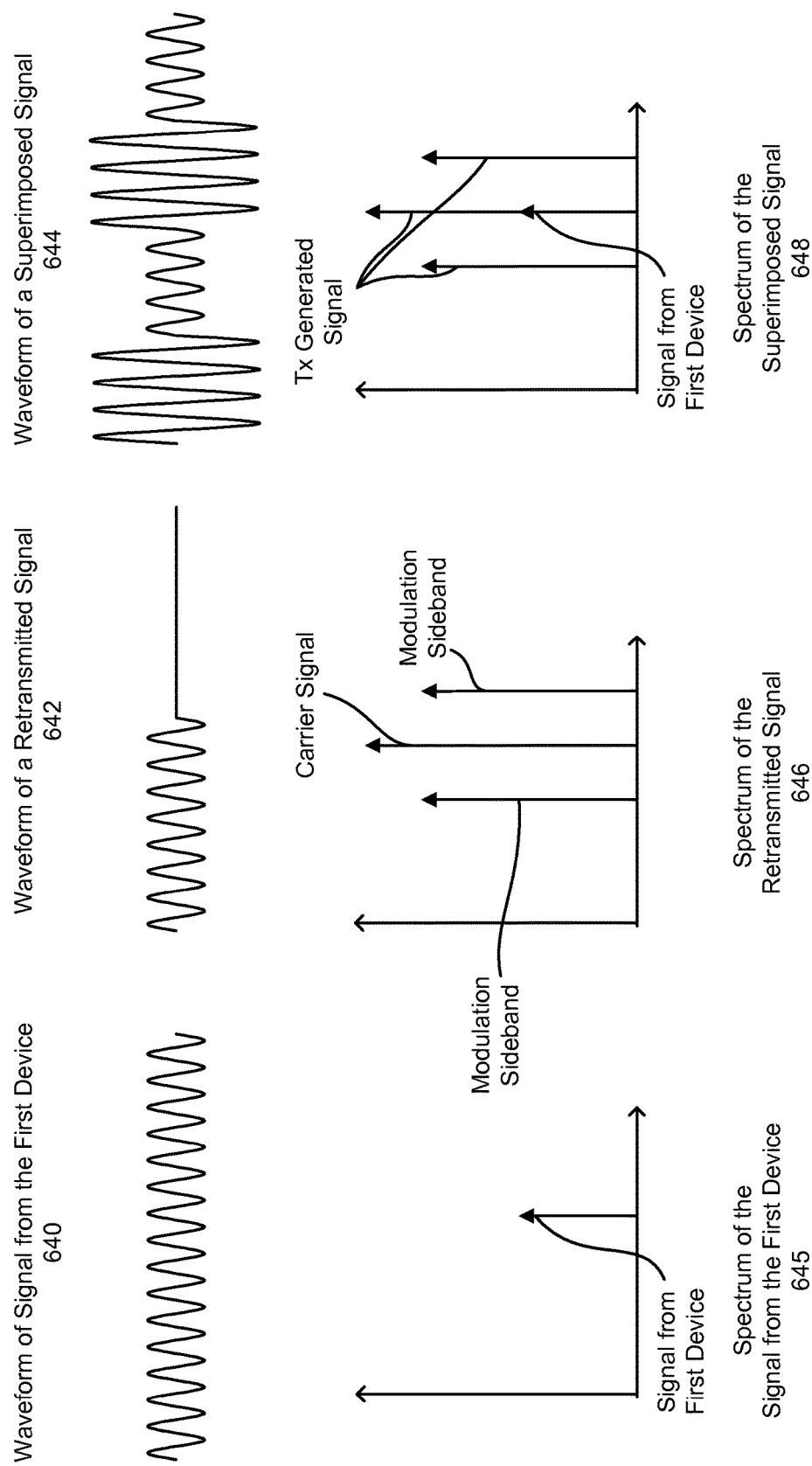
FIG. 6 illustrates waveforms and frequency spectra associated with the second device described in connection with FIG. 5.

The first device 102 may send a signal 506 to the second device 504. In the case of NFC, the signal 506 may have a carrier frequency of 13.56 MHz. One example of the waveform of the signal 506 from the first device 102 is illustrated in FIG. 6.

The second device 504 may receive the signal 506 via an antenna 528. In the case of NFC, the antenna 528 may be a loop antenna (also referred to as a loop-inductor antenna) that may include one or more coils. The antenna 528 may be coupled to a magnetic field generated by the first device 102. The signal 506 may excite a current at the operating frequency of the inductively coupled communication. Furthermore, the antenna 528 may generate a magnetic field.

The second device 504 may include a matching network 538 that is coupled to the antenna 528. The matching network 538 may perform impedance matching between a transmission (Tx) block 536 and the antenna 528.

The Tx block 536 may generate a retransmitted modulated signal 513 to transmit to the first device 102 during ALM. In one configuration, a PLL block 534 may regenerate the signal 506 from the first device 102. For example, the PLL block 534 may regenerate the carrier wave field clock of the received signal 506. The PLL block 534 may provide the regenerated signal 510 to the Tx block 536.

The Tx block 536 may modulate the regenerated signal 510 to produce the retransmitted modulated signal 513. After passing the retransmitted modulated signal 513 through the matching network 538, the retransmitted modulated signal 513 may be provided to the antenna 528 for transmission to the first device 102.

The waveform and spectrum of the retransmitted modulated signal 513 at the output of the Tx block 536 are illustrated in FIG. 6. It should be noted, that the carrier signal of the retransmitted modulated signal 513 may be stronger than the received signal 506 from the first device 102.

In order for active load modulation (ALM) to operate correctly, the retransmitted modulated signal 513 may be phase locked to the received signal 506 from the first device 102. The phase-locked loop (PLL) block 534 may synchronize the second device 504 to the first device 102.

Because the second device 504 transmits and receives on the same antenna 528, the received signal 506 and the retransmitted modulated signal 513 may be superimposed. The superimposed signal 516 is formed when the retransmitted modulated signal 513 is superimposed on the received signal 506. The waveform and frequency spectrum of the superimposed signal 516 at the antenna 528 are illustrated in FIG. 6.

If the retransmitted modulated signal 513 is stronger than the received signal 506, then the PLL block 534 may not be able to lock to the received signal. The stronger carrier of the retransmitted modulated signal 513 from the second device 504 may obscure the carrier of the received signal 506 and the second device 504 may not be able to synchronize with the first device 102.

FIG. 6 illustrates waveforms and frequency spectra associated with the second device 504 described in connection with FIG. 5. The waveforms depicted in FIG. 6 are presented as amplitude of a signal plotted versus time. The frequency spectra depicted in FIG. 6 are presented as amplitude a signal versus frequency.

The waveform 640 of the signal 506 from the first device 102 corresponds to the signal 506 from the first device 102 received at the antenna 528 of the second device 504. The spectrum 645 of the signal 506 from the first device 102 shows the amplitude of the received signal 506. In the case of near-field communication (NFC), the waveform 640 may have a frequency of 13.56 MHz. The frequency of the signal 506 may vary by plus or minus 7 kilohertz (kHz) according to NFC specifications.

The waveform 642 of the retransmitted modulated signal 513 shows an example of modulation that may be produced by the second device 504. As seen in the spectrum 646 of the retransmitted modulated signal 513, the retransmitted modulated signal 513 may include a carrier signal and modulation sidebands.

The waveform 644 of the superimposed signal 516 shows an example of the received signal 506 combined with the retransmitted modulated signal 513 at the antenna 528. As depicted in the spectrum 648 of the superimposed signal 516, the superimposed signal 516 includes the transmitter (Tx) generated signal (i.e., the carrier signal and modulation sidebands of the retransmitted modulated signal 513) and the signal 506 from the first device 102. It should be noted that the carrier and modulation sidebands of the retransmitted modulated signal 513 have greater amplitudes than the received signal 506.

Figure 7:
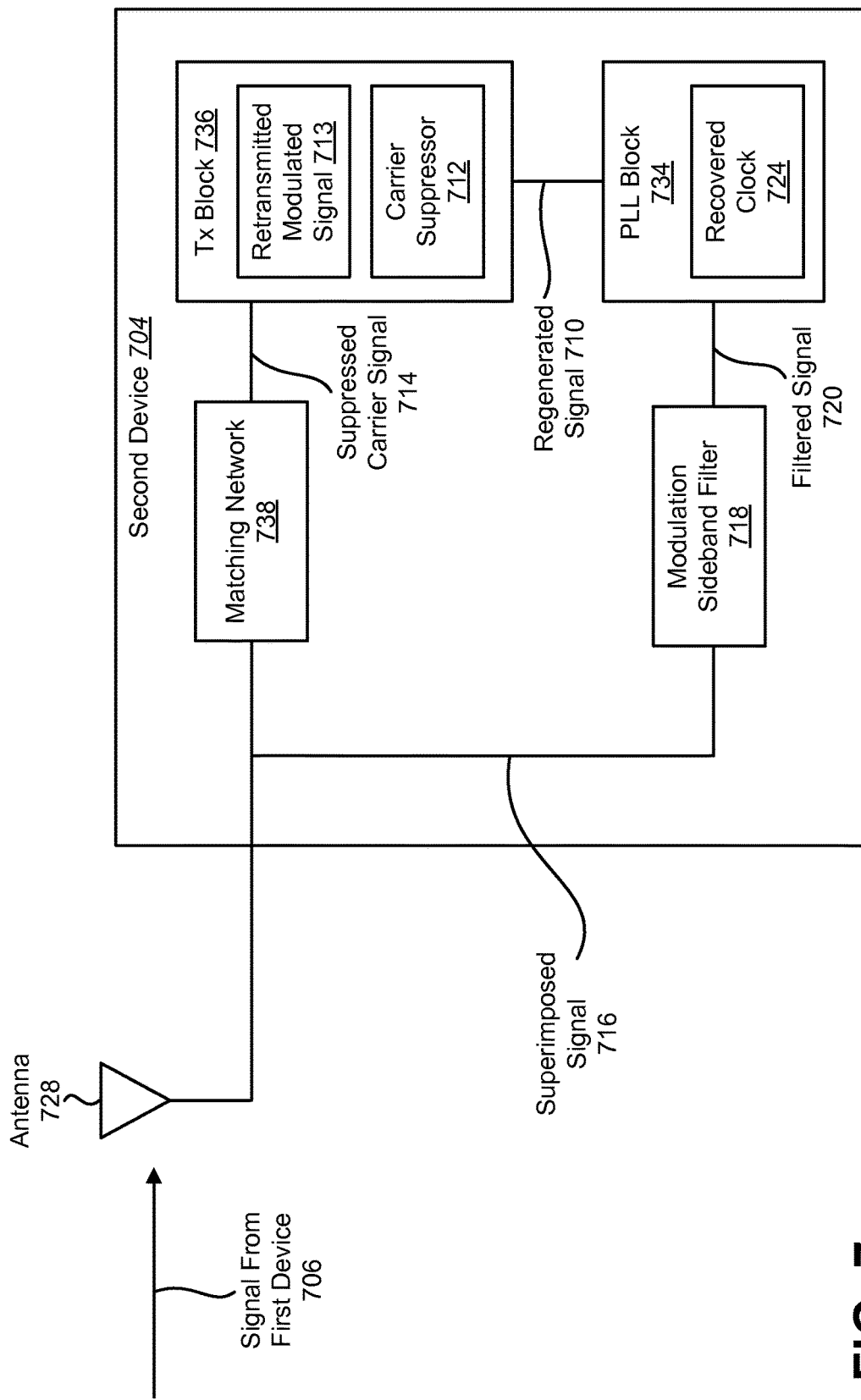
FIG. 7 is a block diagram illustrating another detailed configuration of a second device in which inductively coupled communication may be implemented.

FIG. 7 is a block diagram illustrating another detailed configuration of a second device 704 in which inductively coupled communication may be implemented. The second device 704 may be implemented in accordance with the second device 104 described in connection with FIG. 1. The second device 704 may communicate with a first device 102 (not shown) using inductively coupled communication. In one configuration, the inductively coupled communication may be near-field communication (NFC).

The second device 704 may receive a signal 706 from the first device 102. In the case of NFC, the signal 706 may have a carrier frequency of 13.56 megahertz (MHz). One example of the waveform of the signal 706 from the first device 102 is illustrated in FIG. 8.

The second device 704 may receive the signal 706 via an antenna 728. As described above, the antenna 728 may be a loop antenna (also referred to as a loop-inductor antenna) that may include one or more coils. The antenna 728 may be coupled to a magnetic field generated by the first device 102. The signal 706 may excite a current at the operating frequency of the inductively coupled communication. Furthermore, the antenna 728 may generate a magnetic field.

The second device 704 may include a matching network 738 that is coupled to the antenna 728. The matching network 738 may perform impedance matching between a transmission (Tx) block 736 and the antenna 728.

In one approach to active load modulation (ALM), the PLL block 734 may regenerate the signal 706 from the first device 102. The second device 704 may use the regenerated signal 710 to communicate with the first device 102. For example, the PLL block 734 may regenerate the carrier wave field clock of the received signal 706. The PLL may provide the regenerated signal 710 to the Tx block 736.

The Tx block 736 may modulate and amplify the regenerated signal 710 for retransmission back to the first device 102. For example, the Tx block 736 may generate a retransmitted modulated signal 713. The modulation may be produced by modulation sidebands that are associated with the carrier of the regenerated signal 710. To achieve a strong coupling factor between the first device 102 and the second device 704, the retransmitted modulated signal 713 may be stronger than the signal 706 received from the first device 102. In one approach to ALM, the carrier and the modulation sidebands of retransmitted signal may have greater amplitudes (e.g., power) than the received signal 706.

The Tx block 736 may include a carrier suppressor 712 to suppress the carrier of the retransmitted modulated signal 713. The carrier suppressor 712 may generate a suppressed carrier signal 714 from the retransmitted modulated signal 713 for retransmission to the first device 102. For example, the carrier suppressor 712 may reduce the carrier amplitude of the retransmitted modulated signal 713 below the carrier amplitude of the received signal 106.

The waveform and spectrum of the suppressed carrier signal 714 at the output of the Tx block 736 are illustrated in FIG. 8. It should be noted, that the carrier amplitude of the suppressed carrier signal 714 may be less than the carrier amplitude of the received signal 706 from the first device 102. However, the amplitude of the modulation sidebands for the suppressed carrier signal 714 may be greater than the carrier amplitude of the received signal 706.

After passing the suppressed carrier signal 714 through the matching network 738, the suppressed carrier signal 714 may be provided to the antenna 728 for transmission to the first device 102. The suppressed carrier signal 714 may be superimposed on the received signal 706 from the first device 102. In one configuration, the second device 704 may have a single antenna 728 to receive the signal 706 from the first device 102 and transmit the suppressed carrier signal 714. In this configuration, the suppressed carrier signal 714 may be combined (e.g., superimposed) with the received signal 706 at the antenna 728. The waveform and spectrum of the superimposed signal 716 at the antenna 728 are illustrated in FIG. 8.

A modulation sideband filter 718 may receive the superimposed signal 716 and produce a filtered signal 720. The modulation sideband filter 718 may reduce the amplitude of modulation sidebands of the superimposed signal 716 below the amplitude of the received signal 706. Therefore, the filtered signal 720 may be a combination of the suppressed modulation sidebands and carrier of the suppressed carrier signal 714 and the received signal 706. The waveform and spectrum of the filtered signal 720 at the antenna 728 are illustrated in FIG. 8.

The PLL block 734 may synchronize the second device 704 to the first device 102 based on the filtered signal 720. The PLL block 734 may recover a clock 724 from the received signal 706 using the filtered signal 720. The recovered clock 724 may be the carrier frequency (e.g., field clock) of the received signal 706. Because the modulation sidebands and the carrier of the retransmitted signal (i.e., the suppressed carrier signal 714) are less than the received signal 706, the PLL block 734 may lock to the signal 706 of the first device 102.

Using the recovered clock 724, the phase of the suppressed carrier signal 714 may be synchronized with the signal 706 from the first device 102. Therefore, the regenerated signal 710 may be synchronized in phase with the received signal 706. The resulting level of modulation at the first device 102 may be higher than can be achieved with traditional passive (e.g., resistive) load modulation.

Figure 8A:
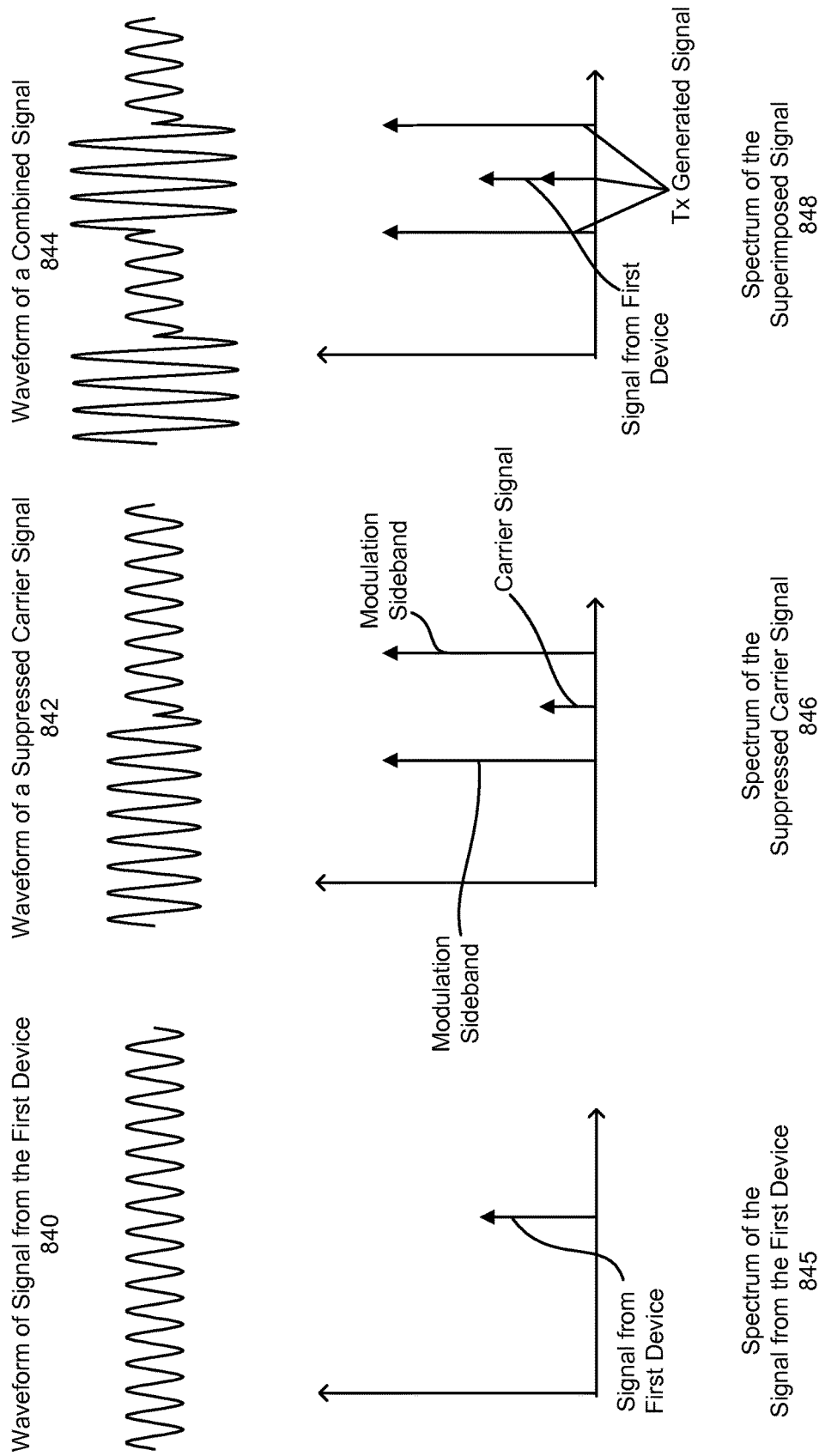
FIGS. 8A and 8B illustrate waveforms and frequency spectra associated with the second device described in connection with FIG. 7.
Figure 8B:
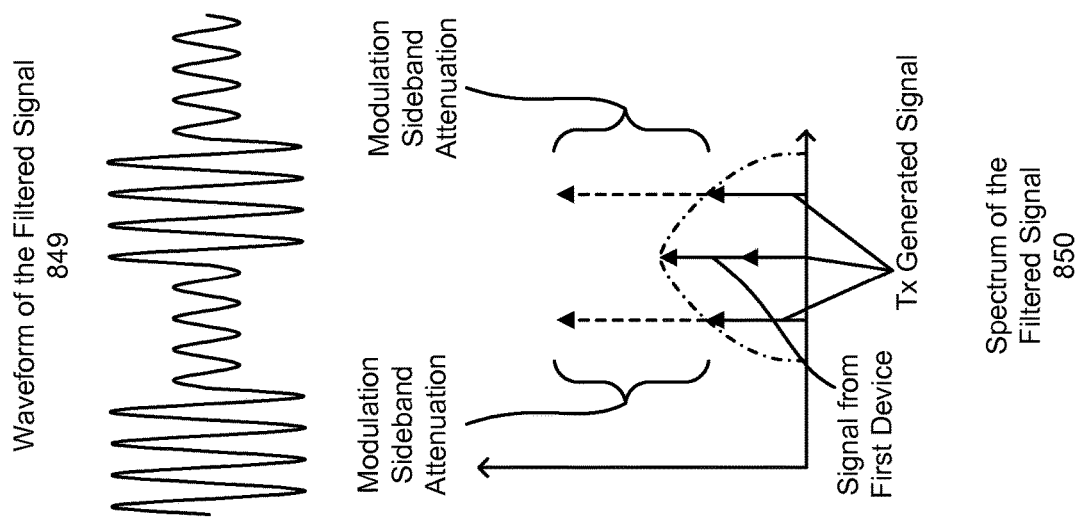

FIGS. 8A and 8B illustrate waveforms and frequency spectra associated with the second device 704 described in connection with FIG. 7. The waveforms depicted in FIGS. 8A and 8B are presented as amplitude of a signal plotted versus time. The frequency spectra depicted in FIGS. 8A and 8B are presented as amplitude of a signal versus frequency.

In FIG. 8A, the waveform 840 of the signal 706 from the first device 102 corresponds to the signal 706 from the first device 102 received at the antenna 728 of the second device 704. The spectrum 845 of the signal 706 from the first device 102 shows the amplitude of the received signal 706. In the case of near-field communication (NFC), the waveform 840 may have a frequency of 13.56 MHz (plus or minus 7 kilohertz (kHz)) according to NFC specifications.

The waveform 842 of the suppressed carrier signal 714 shows an example of modulation and amplification of the retransmitted modulated signal 713 that may be produced by the second device 704. As seen in the spectrum 846 of the suppressed carrier signal 714, the suppressed carrier signal 714 may include a carrier signal and modulation sidebands. However, as compared to the spectrum 646 of the retransmitted modulated signal 513 described in connection with FIG. 6, the carrier signal of the suppressed carrier signal 714 is reduced.

The waveform 844 of the superimposed signal 716 shows an example of the received signal 706 combined with the suppressed carrier signal 714 at the antenna 728. As depicted in the spectrum 848 of the superimposed signal 716, the superimposed signal 716 includes the transmitter (Tx) generated signal (i.e., the carrier signal and modulation sidebands of the suppressed carrier signal 714) and the signal 706 from the first device 102. It should be noted that the modulation sidebands of the suppressed carrier signal 714 may have greater amplitudes than the received signal 706. However, the carrier of the suppressed carrier signal 714 is less than the carrier of the received signal 706.

In FIG. 8B, the waveform 849 and the spectrum 850 of the filtered signal 720 shows an example of the modulation sideband attenuation produced by the modulation sideband filter 718. The amplitude of the modulation sidebands are reduced below the amplitude of the received signal 706 carrier. Therefore, in the signal received by the PLL block 734 (i.e., the filtered signal 720), the carrier from the received signal 706 is greater than the carrier and the modulation sidebands produced by the second device 704 itself. The PLL block 734 may lock to the received signal 706 using the filtered signal 720.

Figure 9:
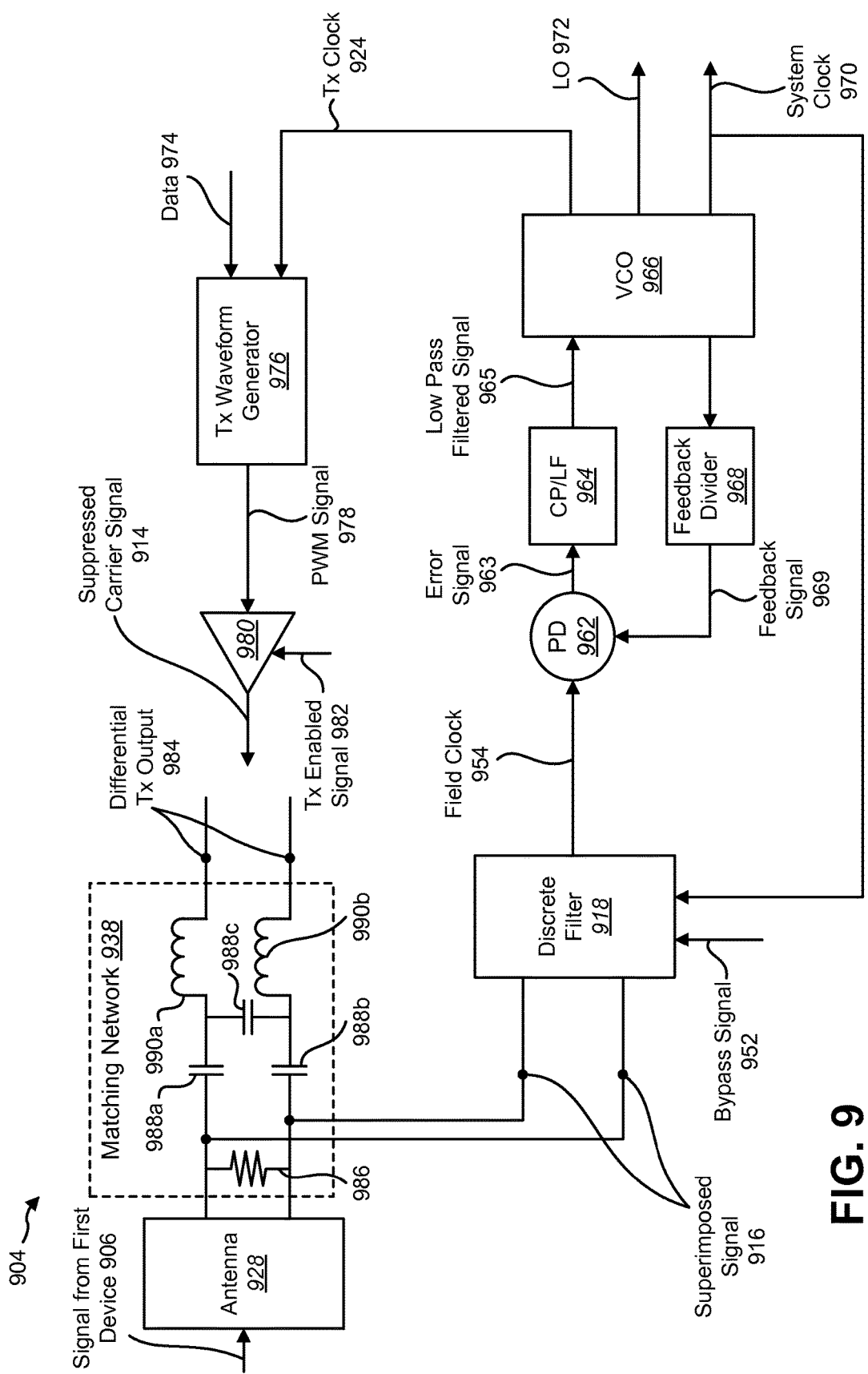
FIG. 9 is a block diagram illustrating yet another detailed configuration of a second device in which inductively coupled communication may be implemented.

FIG. 9 is a block diagram illustrating yet another detailed configuration of a second device 904 in which inductively coupled communication may be implemented. The second device 904 may be implemented in accordance with the second device 104 described in connection with FIG. 1. The second device 904 may communicate with a first device 102 (not shown) using inductively coupled communication. In one configuration, the inductively coupled communication may be near-field communication (NFC). In the case of NFC, the first device 102 may be referred to as a polling device and the second device 904 may be referred to as a listening device.

The second device 904 may receive a signal 906 from the first device 102. In the case of NFC, the signal 906 may have a carrier frequency of 13.56 MHz. The received signal 906 may also be referred to as a carrier wave (CW).

The second device 904 may receive the signal 906 via an antenna 928. As described above, the antenna 928 may be a loop antenna (also referred to as a loop-inductor antenna) that may include one or more coils. The antenna 928 may be coupled to a magnetic field generated by the first device 102. The signal 906 may excite a current at the operating frequency of the inductively coupled communication. Furthermore, the antenna 928 may generate a magnetic field.

The second device 904 may include a matching network 938 that is coupled to the antenna 928. The matching network 938 may perform impedance matching between a transmission (Tx) block 936 and the antenna 928. In one configuration, the matching network may include a resistor 986 that is coupled between a first node and a second node of the antenna 928. The first node and a second node of the antenna 928 may correspond to the inputs of a loop antenna 928. A first capacitor 988a may be coupled to the first node of the antenna 928 and a second capacitor 988b may be coupled to the second node of the antenna 928. The first capacitor 988a may also be coupled to a first inductor 990a and the second capacitor 988b may be coupled to a second inductor 990b. A third capacitor 988c may be coupled between the first inductor 990a and the second inductor 990b.

The second device 904 may include circuitry that forms a phase-locked loop (PLL). A phase detector (PD) 962 may receive a field clock 954 and a feedback signal 969. The field clock 954 may be function as a reference signal for the PLL. The PD 962 may compare the field clock 954 and the feedback signal 969 to produce an error signal 963.

A charge pump/loop filter (CP/LF) 964 may be coupled to the phase detector (PD) 962. The CP/LF 964 may receive the error signal 963. The CP/LF 964 may apply a low pass filter to the error signal 963 to produce a low pass-filtered signal 965.

A voltage controlled oscillator (VCO) 966 may be coupled to the CP/LF 964. The VCO 966 may be driven by the low pass-filtered signal 965 to generate one or more output signals. The VCO 966 may operate at a frequency that is an integer multiple of the carrier frequency. In the case of NFC, the carrier frequency is 13.56 MHz and the VCO 966 may operate at 433.92 MHz, which is the 32nd integer multiple of the carrier frequency. The VCO 966 may generate a system clock 970, a local oscillator (LO) signal 972 and a transmission (Tx) clock 924. The Tx clock 924 may be provided to a transmission (Tx) waveform generator 976. The LO signal 972 may be provided to the local oscillator. The system clock 970 may be provided to other blocks, including digital blocks.

The VCO 966 may be coupled to a feedback divider 968. The output of the VCO 966 may be provided to the feedback divider 968 and divided by a value 1/N to produce the feedback signal 969. It should be noted that the phase detector (PD) 962 charge pump/loop filter (CP/LF) 964, the LC VCO 966 and the feedback divider 968 may form the phase-locked loop (PLL).

The Tx clock 924 may be used to regenerate the received signal 906. The Tx waveform generator 976 may perform pulse width modulation (PWM) and pulse shaping using the Tx clock 924 and input data 974 to produce a PWM signal 978. While generating the PWM signal 978, the Tx waveform generator 976 may suppress the carrier of the PWM signal 978. For example, the Tx waveform generator 976 may reduce the carrier amplitude of the PWM signal 978 below the carrier amplitude of the received signal 906.

The PWM signal 978 may be amplified in an amplifier 980 to produce the suppressed carrier signal 914 that is transmitted to the first device 102. In one configuration, the amplifier 980 is a class-D power amplifier. The amplifier 980 may receive a Tx enabled signal 982 that may enable or disable transmissions. The suppressed carrier signal 914 may be provided to the matching network 938 as a differential transmission (Tx) output 984.

It should be noted that the carrier amplitude of the suppressed carrier signal 914 may be less than the carrier amplitude of the received signal 906 from the first device 102. However, the amplitude of the modulation sidebands for the suppressed carrier signal 914 may be greater than the carrier amplitude of the received signal 906.

After passing the suppressed carrier signal 914 through the matching network 938, the suppressed carrier signal 914 may be provided to the antenna 928 for transmission to the first device 102. The suppressed carrier signal 914 may be superimposed on the received signal 906 from the first device 102 at the antenna 928.

A discrete filter 918 may receive the superimposed signal 916 and produce the field clock 954 of the received signal 906. The discrete filter 918 may reduce the amplitude of modulation sidebands of the superimposed signal 916 below the amplitude of the received signal 906. Because the carrier is suppressed in the suppressed carrier signal 914 and the modulation sidebands are filtered out by the discrete filter, the output of the discrete filter 918 is dominated by the field clock 954 (e.g., carrier frequency) of the received signal 906.

In one configuration, the discrete filter 918 may be clocked by the regenerated signal. For example, the discrete filter 918 may be clocked by the system clock 970 generated by the VCO 966. In this configuration, there is no need for another clock signal for the discrete filter 918. With this configuration, a high quality (Q) factor is also achievable for inductively coupled communication.

The discrete filter 918 may be enabled or disabled by a bypass signal 952. When the discrete filter 918 is enabled, the discrete filter 918 may filter the modulation sidebands of the superimposed signal 916. When the discrete filter 918 is disabled, the discrete filter 918 may be bypassed and the superimposed signal 916 may pass unfiltered.

Using the field clock 954, the phase of the suppressed carrier signal 914 may be synchronized with the signal 906 from the first device 102. Therefore, the suppressed carrier signal 914 may be synchronized in phase with the received signal 906. The resulting level of modulation at the first device 102 may be higher than can be achieved with traditional passive (e.g., resistive) load modulation.

Figure 10:
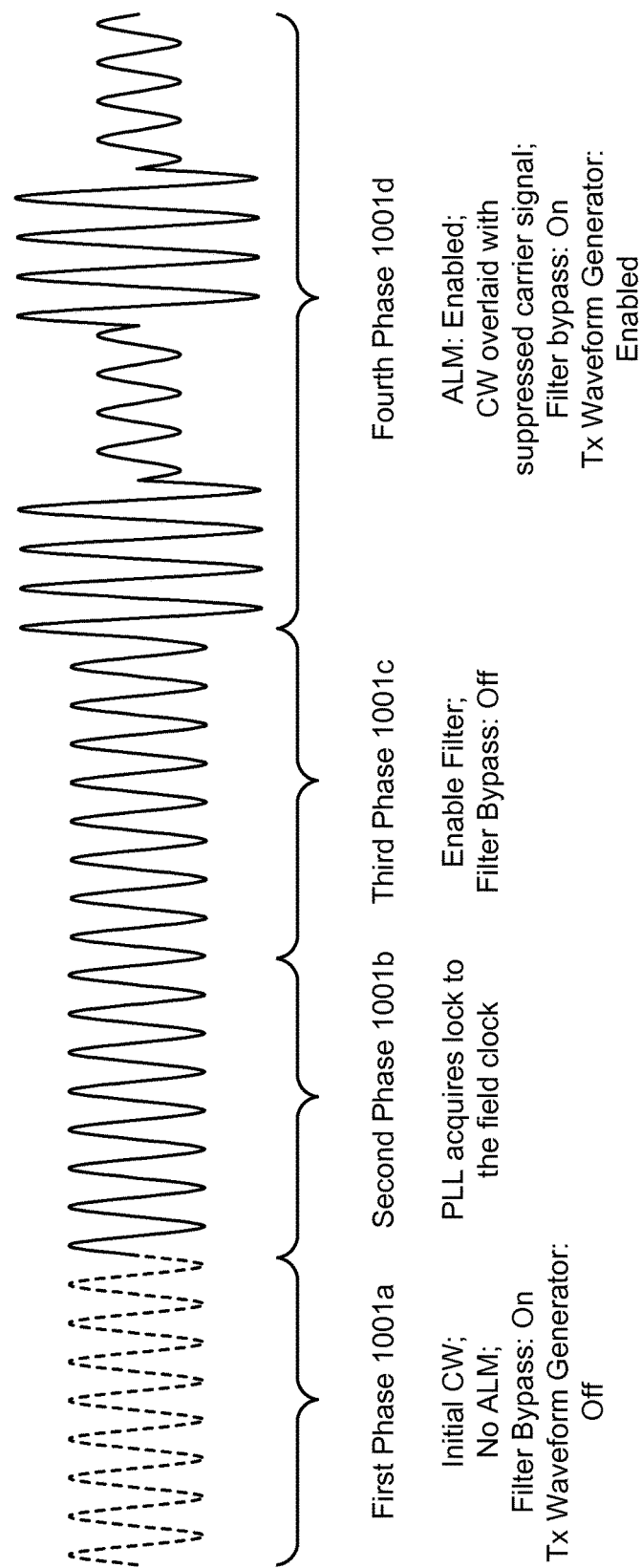
FIG. 10 illustrates various phases of inductively coupled communication by a second device.

FIG. 10 illustrates various phases 1001 of inductively coupled communication by a second device 904. The waveform of the superimposed signal 916 is illustrated in FIG. 10.

In a first phase 1001a, the second device 904 may receive an initial signal 906 from a first device 102. The received signal 906 may be a carrier wave (CW) that has a field clock 954 (e.g., carrier frequency). During the first phase 1001a, the second device 904 does not perform ALM. For example, the Tx enabled signal 982 may disable the amplifier 980 and the Tx waveform generator 976 may be off. The bypass signal 952 indicates that the discrete filter 918 is bypassed. The dashed superimposed signal 916 in the first phase 1001a indicates that the second device 904 is not synchronized with the first device 102.

In a second phase 1001b, PLL circuitry of the second device 904 acquires a lock to the field clock 954. During this phase 1001b, the second device 904 may recover the clock of the first device 102. The solid superimposed signal 916 in the second phase 1001b indicates that the second device 904 is synchronized with the first device 102.

In a third phase 1001c, the second device 904 may enable the discrete filter 918. For example, the bypass signal 952 may be set to "off", indicating that the filter bypass is off.

In a fourth phase 1001d, the second device 904 may perform ALM. The received signal 906 (e.g., the carrier wave of the first device 102) is superimposed with the suppressed carrier signal 914. The Tx enabled signal 982 may be set to "on", enabling the amplifier 980. Tx waveform generator 976 may be enabled. The filter bypass signal 952 may be set to "on."

Figure 11:
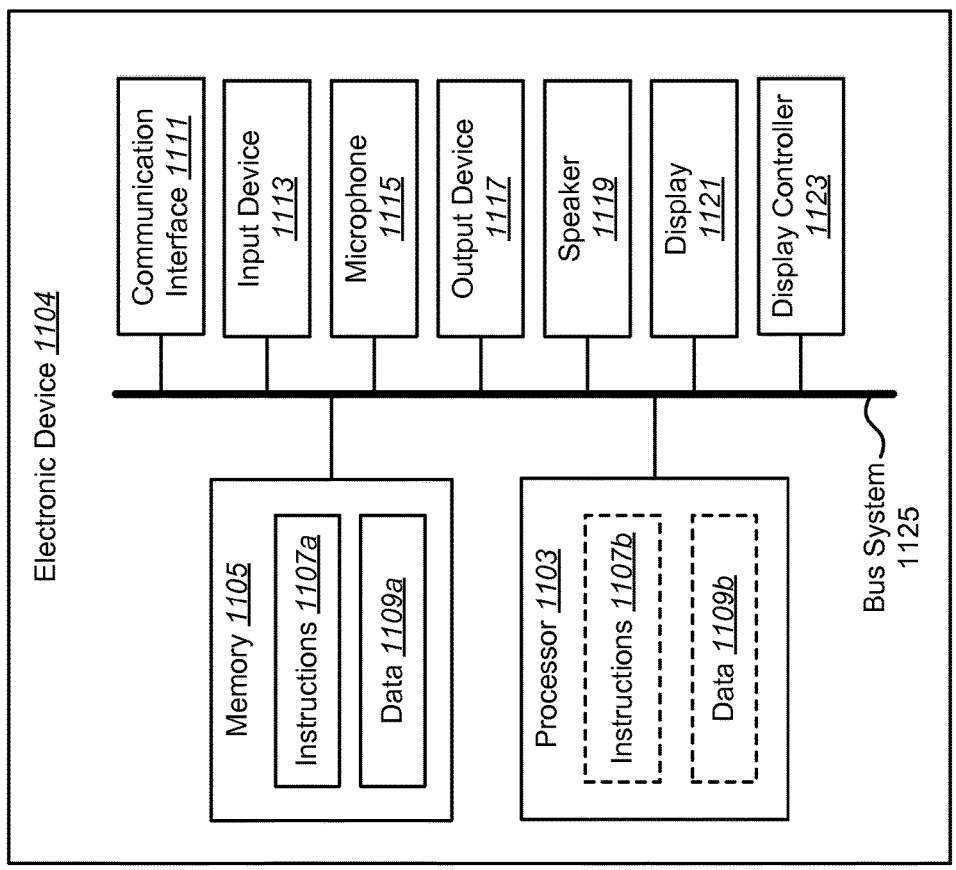
FIG. 11 illustrates various components that may be utilized in an electronic device.

FIG. 11 illustrates various components that may be utilized in an electronic device 1104. The illustrated components may be located within the same physical structure or in separate housings or structures. The electronic device 1104 described in connection with FIG. 11 may be implemented in accordance with one or more of the electronic devices 104, 504, 704, 904 described herein.

The electronic device 1104 includes a processor 1103. The processor 1103 may be a general purpose single- or multi-chip microprocessor (e.g., an advanced RISC machine (ARM)), a special purpose microprocessor (e.g., a digital signal processor (DSP)), a microcontroller, a programmable gate array, etc. The processor 1103 may be referred to as a central processing unit (CPU). Although just a single processor 1103 is shown in the electronic device 1104 of FIG. 11, in an alternative configuration, a combination of processors 1103 (e.g., an ARM and DSP) could be used.

The electronic device 1104 also includes memory 1105 in electronic communication with the processor 1103. That is, the processor 1103 may read information from and/or write information to the memory 1105. The memory 1105 may be any electronic component capable of storing electronic information. The memory 1105 may be random access memory (RAM), read-only memory (ROM), magnetic disk storage media, optical storage media, flash memory devices in RAM, on-board memory included with the processor 1103, programmable read-only memory (PROM), erasable programmable read-only memory (EPROM), electrically erasable PROM (EEPROM), registers, and so forth, including combinations thereof.

Data 1109a and instructions 1107a may be stored in the memory 1105. The instructions 1107a may include one or more programs, routines, sub-routines, functions, procedures, etc. The instructions may include a single computer-readable statement or many computer-readable statements. The instructions 1107a may be executable by the processor 1103 to implement one or more of the methods, functions and procedures described above. Executing the instructions may involve the use of the data 1109a that is stored in the memory 1105. FIG. 11 shows some instructions 1107b and data 1109b being loaded into the processor 1103 (which may come from instructions 1107a and data 1109a that are stored in the memory 1105).

The electronic device 1104 may also include one or more communication interfaces 1111 for communicating with other electronic devices. The communication interfaces 1111 may be based on wired communication technology, wireless communication technology, or both. Examples of different types of communication interfaces 1111 include a serial port, a parallel port, a Universal Serial Bus (USB), an Ethernet adapter, an Institute of Electrical and Electronics Engineers (IEEE) 1394 bus interface, a near-field communication (NFC) transceiver, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 1111 may be coupled to one or more antennas (not shown) for transmitting and receiving wireless signals.

The electronic device 1104 may also include one or more input devices 1113 and one or more output devices 1117. Examples of different kinds of input devices 1113 include a keyboard, mouse, microphone 1115, remote control device, button, joystick, trackball, touchpad, lightpen, etc. For instance, the electronic device 1104 may include one or more microphones 1115 for capturing acoustic signals. In one configuration, a microphone 1115 may be a transducer that converts acoustic signals (e.g., voice, speech) into electrical or electronic signals. Examples of different kinds of output devices 1117 include a speaker 1119, printer, etc. For instance, the electronic device 1104 may include one or more speakers 1119. In one configuration, a speaker 1119 may be a transducer that converts electrical or electronic signals into acoustic signals. One specific type of output device 1117 that may be typically included in an electronic device 1104 is a display 1121 device. Display 1121 devices used with configurations disclosed herein may utilize any suitable image projection technology, such as a cathode ray tube (CRT), liquid crystal display (LCD), light-emitting diode (LED), gas plasma, electroluminescence, or the like. A display controller 1123 may also be provided, for converting data stored in the memory 1105 into text, graphics, and/or moving images (as appropriate) shown on the display 1121 device.

The various components of the electronic device 1104 may be coupled together by one or more buses, which may include a power bus, a control signal bus, a status signal bus, a data bus, etc. For simplicity, the various buses are illustrated in FIG. 11 as a bus system 1125. It should be noted that FIG. 11 illustrates only one possible configuration of an electronic device 1104. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for inductively coupled communications, comprising:
    generating a retransmitted modulated signal that is stronger than a received signal from a first device;
    generating a suppressed carrier signal from the retransmitted modulated signal for retransmission to the first device;
    superimposing the suppressed carrier signal on the received signal to produce a superimposed signal;
    filtering the superimposed signal to attenuate modulation sidebands to produce a filtered signal; and
    synchronizing to the first device based on the filtered signal.

2. The method of claim 1, wherein the retransmitted modulated signal comprises a carrier and modulation sidebands that have greater amplitudes than the received signal.

3. The method of claim 1, wherein generating the suppressed carrier signal comprises reducing a carrier amplitude of the retransmitted modulated signal below the amplitude of the received signal.

4. The method of claim 1, wherein filtering the superimposed signal to attenuate modulation sidebands comprises reducing an amplitude of modulation sidebands of the superimposed signal below an amplitude of the received signal.

5. The method of claim 1, wherein synchronizing to the first device comprises recovering a clock from the received signal using the filtered signal.

6. The method of claim 5, wherein synchronizing to the first device further comprises phase locking the suppressed carrier signal to the received signal using phase-locked loop (PLL) circuitry.

7. The method of claim 5, wherein the filtering comprises discrete filtering using the recovered clock from the received signal.

8. The method of claim 1, wherein the inductively coupled communications are near-field communications (NFC).

9. The method of claim 1, wherein the suppressed carrier signal is generated for active load modulation to retransmit a modulated signal.

10. Circuitry for inductively coupled communications, comprising:
    a retransmitted signal generator that generates a retransmitted modulated signal that is stronger than a received signal from a first device;
    a suppressed carrier signal generator that generates a suppressed carrier signal from the retransmitted modulated signal for retransmission to the first device;
    an antenna that superimposes the suppressed carrier signal on the received signal to produce a superimposed signal;
    a modulation sideband filter that filters the superimposed signal to attenuate modulation sidebands to produce a filtered signal; and
    a synchronization block that synchronizes to the first device based on the filtered signal.

11. The circuitry of claim 10, wherein the retransmitted modulated signal comprises a carrier and modulation sidebands that have greater amplitudes than the received signal.

12. The circuitry of claim 10, wherein generating the suppressed carrier signal comprises reducing a carrier amplitude of the retransmitted modulated signal below the amplitude of the received signal.

13. The circuitry of claim 10, wherein filtering the superimposed signal to attenuate modulation sidebands comprises reducing an amplitude of modulation sidebands of the superimposed signal below an amplitude of the received signal.

14. The circuitry of claim 10, wherein synchronizing to the first device comprises recovering a clock from the received signal using the filtered signal.

15. The circuitry of claim 14, wherein synchronizing to the first device further comprises phase locking the suppressed carrier signal to the received signal using phase-locked loop (PLL) circuitry.

16. The circuitry of claim 10, wherein the inductively coupled communications are near-field communications (NFC).

17. An apparatus for inductively coupled communications, comprising:
    means for generating a retransmitted modulated signal that is stronger than a received signal from a first device;
    means for generating a suppressed carrier signal from the retransmitted modulated signal for retransmission to the first device;
    means for superimposing the suppressed carrier signal on the received signal to produce a superimposed signal;
    means for filtering the superimposed signal to attenuate modulation sidebands to produce a filtered signal; and
    means for synchronizing to the first device based on the filtered signal.

18. The apparatus of claim 17, wherein the retransmitted modulated signal comprises a carrier and modulation sidebands that have greater amplitudes than the received signal.

19. The apparatus of claim 17, wherein the means for generating the suppressed carrier signal comprise means for reducing a carrier amplitude of the retransmitted modulated signal below the amplitude of the received signal.

20. The apparatus of claim 17, wherein the means for filtering the superimposed signal to attenuate modulation sidebands comprise means for reducing an amplitude of modulation sidebands of the superimposed signal below an amplitude of the received signal.

21. The apparatus of claim 17, wherein the means for synchronizing to the first device comprise means for recovering a clock from the received signal using the filtered signal.

22. The apparatus of claim 21, wherein the means for synchronizing to the first device further comprise means for phase locking the suppressed carrier signal to the received signal using phase-locked loop (PLL) circuitry.

23. The apparatus of claim 17, wherein the inductively coupled communications are near-field communications (NFC).

24. A non-transitory computer-readable medium for inductively coupled communications having instructions thereon, the instructions comprising:
    code for causing an apparatus to generate a retransmitted modulated signal that is stronger than a received signal from a first device;
    code for causing the apparatus to generate a suppressed carrier signal from the retransmitted modulated signal for retransmission to the first device;
    code for causing the apparatus to superimpose the suppressed carrier signal on the received signal to produce a superimposed signal;
    code for causing the apparatus to filter the superimposed signal to attenuate modulation sidebands to produce a filtered signal; and
    code for causing the apparatus to synchronize to the first device based on the filtered signal.

25. The non-transitory computer-readable medium of claim 24, wherein the retransmitted modulated signal comprises a carrier and modulation sidebands that have greater amplitudes than the received signal.

26. The non-transitory computer-readable medium of claim 24, wherein the code for causing the apparatus to generate the suppressed carrier signal comprises code for causing the apparatus to reduce a carrier amplitude of the retransmitted modulated signal below the amplitude of the received signal.

27. The non-transitory computer-readable medium of claim 24, wherein the code for causing the apparatus to filter the superimposed signal to attenuate modulation sidebands comprises the code for causing the apparatus to reduce an amplitude of modulation sidebands of the superimposed signal below an amplitude of the received signal.

28. The non-transitory computer-readable medium of claim 24, wherein the code for causing the apparatus to synchronize to the first device comprises the code for causing the apparatus to recover a clock from the received signal using the filtered signal.

29. The non-transitory computer-readable medium of claim 28, wherein the code for causing the apparatus to synchronize to the first device further comprises the code for causing the apparatus to phase lock the suppressed carrier signal to the received signal using phase-locked loop (PLL) circuitry.

30. The non-transitory computer-readable medium of claim 24, wherein the inductively coupled communications are near-field communications (NFC).

* * * * *